United States Patent
Hawthorne

[15] 3,680,875
[45] Aug. 1, 1972

[54] AIR BRAKE HOSE COUPLER GASKET

[72] Inventor: Vaughn T. Hawthorne, 5223 Deerfield Road, Mechanicsburg, Pa. 17055

[22] Filed: Sept. 18, 1970

[21] Appl. No.: 73,441

[52] U.S. Cl. .................277/171, 277/207, 285/352
[51] Int. Cl. ............................................F16l 17/06
[58] Field of Search......277/171, 207, 209, 210, 211, 277/212 F, 225; 285/99, 352

[56] References Cited

UNITED STATES PATENTS

| | | | |
|---|---|---|---|
| 1,083,350 | 1/1914 | Davis | 277/207 X |
| 3,498,641 | 3/1970 | Bohlen | 285/352 X |
| 3,117,796 | 1/1964 | Liebig | 277/171 X |
| 3,123,367 | 3/1964 | Brummer et al. | 277/171 |
| 2,068,334 | 1/1937 | Kusebach | 285/99 X |

FOREIGN PATENTS OR APPLICATIONS

| | | | |
|---|---|---|---|
| 865,547 | 4/1961 | Great Britain | 277/209 |

Primary Examiner—Robert G. Nilson
Attorney—Hibben, Noyes & Bickness

[57] ABSTRACT

An improved gasket is provided for hose couplers, such as may be used in the air brake line of a railroad car. The gasket fits within a conventional hose coupler and seals with the coupler and also seals with another such gasket, or a conventional gasket, in a connected coupler. The gasket includes an annular outer portion which seals with and fits within a groove in the coupler, an annular outer axially extending inner portion having a mating surface which seals with a similar portion of a gasket in the connected coupler, and an annular lip which engages with the coupler to positively seal the annular portion of the gasket against the coupler. The gaskets are dimensioned to insure effective sealing at the mating surfaces which have rounded corners to prevent tearing of the gasket during coupling and uncoupling and are contoured to permit deformation or flattening so as to provide a seal across the full contact surface between the gaskets.

4 Claims, 6 Drawing Figures

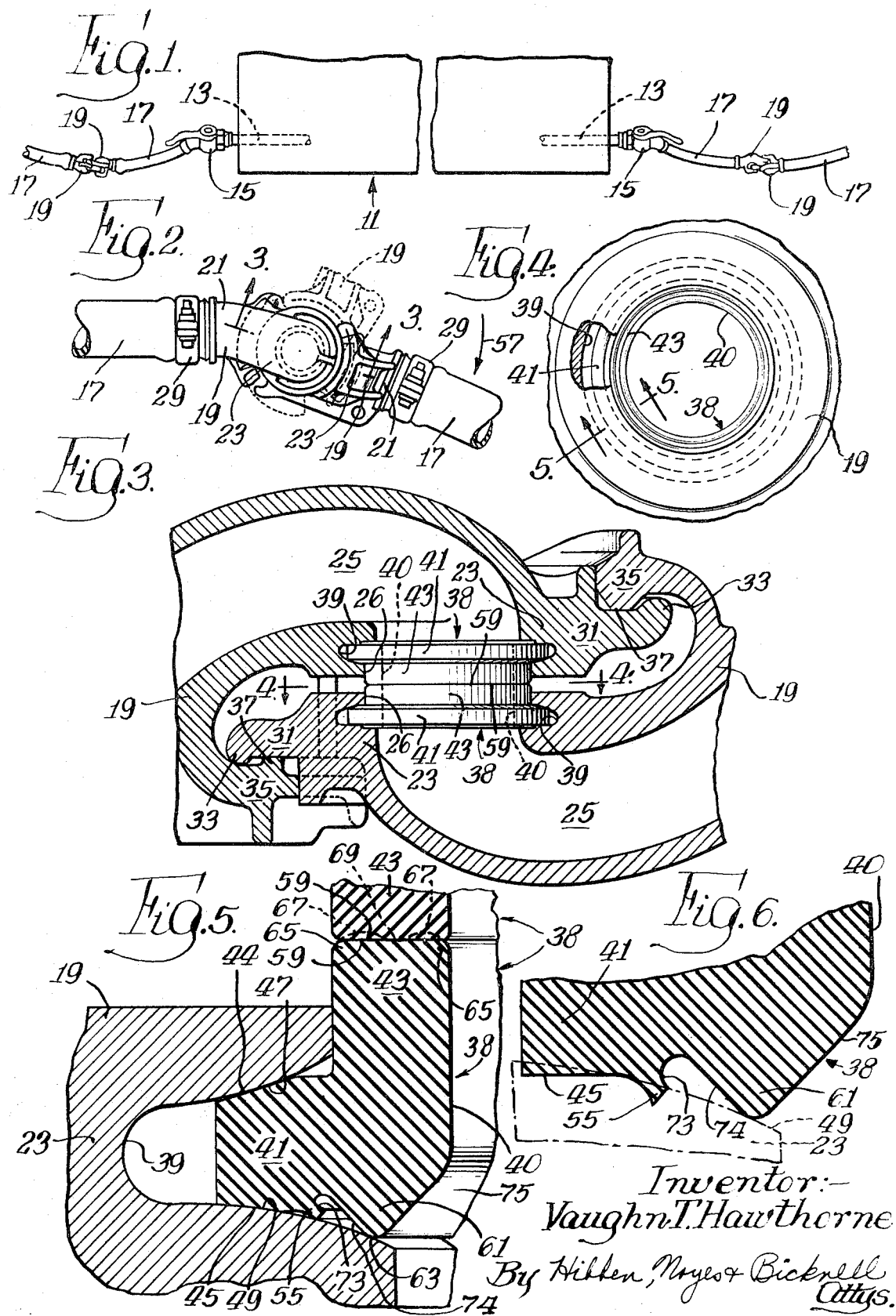

AIR BRAKE HOSE COUPLER GASKET

This invention relates to gaskets and more particularly to gaskets for hose couplers, such as used on air brake lines.

Air operated brakes, such as used on railroad trains, require that lengths of air line or brake pipe of each car be connected together to form a "train line" running the full length of the train. The connections between the cars must be leak proof to insure proper operation of the brakes. The ends of the air lines or brake pipes are fitted with hoses and hose couplers which connect with each other, and each coupler has a gasket which seals against the coupler and also against a similar gasket in the companion coupler to form an air-tight seal. These gaskets operate satisfactorily but have a tendency to wear and then leak. The wear generally occurs between mating surfaces of the gaskets due to friction which occurs during the rotating motion of coupling and uncoupling the hose couplers. The edgewise contact or engagement which occurs between the gaskets during the coupling action also tends to cause tearing away or abrasion of the corners of the gasket, thus reducing its sealing effectiveness. The sealing effect between each gasket and its coupler depends to a large extent on the compression of the gasket against the coupler by forces generated when the mating surfaces of the gaskets are squeezed together during coupling. Consequently, any wear on the mating surfaces reduces this compression and also decreases the seal between each gasket and its coupler.

According to the present invention, a novel gasket is provided which is similar to and interchangeable with the gaskets previously used and has formed thereon a lip portion which is deformed upon installation of the gasket in the coupler and seals the gasket against the coupler independently of the force generated by compressing the mating surfaces of the gaskets together during coupling. Further, the mating surface of the gasket of the present invention has rounded corners which are less subject to tearing or abrasion than were the sharp corners of the gaskets previously used. Preferably, a portion of the mating surface of the gasket of the present invention extends from its coupler to a greater extent than in prior gaskets so as to obtain an increased compressive effect when a pair of couplers are connected and thereby providing a more complete seal, while another portion of the mating surface is recessed or relieved so as to permit the first mentioned portion to be displaced or deformed, thereby providing a seal over the full mating surface of the gasket.

The objects and advantages of the present invention will become apparent from the following detailed description taken in conjunction with the accompanying figures of the drawing, in which:

FIG. 1 is a schematic diagram of a railroad car having an air brake line featuring a preferred embodiment of the gasket of the present invention;

FIG. 2 is an enlarged plan view of a coupler portion of the air brake line;

FIG. 3 is an enlarged fragmentary sectional view taken along the line 3—3 of Fig. 2;

FIG. 4 is a fragmentary sectional view taken along the line 4—4 of Fig. 3 with a portion broken away to better show an underlying portion thereof;

FIG. 5 is a fragmentary enlarged view taken along the line 5—5 of Fig. 4; and

FIG. 6 is a fragmentary enlarged view of a portion of the gasket shown in Fig. 5 prior to installation.

A railroad car indicated at 11 is shown in Fig. 1 and has an air line or brake pipe 13 extending therefrom. The air line forms a part of the brake system for the car 11 and part of a "train line" of a train composed of many cars similar to car 11. Each air line 13 has a pair of angle cocks 15 to close the ends of the air line, and each angle cock 15 is fitted with a hose 17 and a hose coupler 19 to connect the air lines 13 of adjacent cars 11 together to form the "train line."

The coupler 19 is conventional and has a hollow or tubular shank 21 at one end, a connecting portion 23 at the other end, and an air passage 25 formed therein which terminates in an opening or mouth 26. As is shown in Fig. 2, the hose 17 fits over the hollow shank portion 21 of the coupler 19 and is secured thereto by a clamp 29. The connecting portion 23 of each coupler 19 has disposed to one side of the opening 26 a first flange 31 (Fig. 3) having a first raised lip 33 and disposed at the other side of the opening 26 a second flange 35 having a second raised lip 37. The flanges 31 and 35 are axially spaced relative to the opening 26. Moreover, the flanges 31 and 35 and the lips 33 and 37 are short segments of arcs having generally aligned centers which are coaxial with the opening 26 of the air passage 25.

Located in the air passage opening 26 of the coupler 19 is a gasket 38 (Fig. 3) comprising a preferred embodiment of the present invention. The gasket 38 fits in a groove 39 formed in the connecting portion 23 and has a center opening 40. As is shown in Fig. 5, the gasket 38 comprises an annular one-piece body having a radially extending outer portion 41 and an annular axially extending inner portion 43 and is made of a resilient compressible material such as rubber or a synthetic elastomer. The annular outer portion 41 has a tapered surface 44 and an opposite surface 45 which is normally flat, i.e., perpendicular to the axis of the gasket opening 40, as seen in Fig. 6 which shows the gasket shape prior to installation. When the gasket is installed the surfaces 44 and 45 seat against tapered or wedge surfaces 47 and 49, respectively, of the groove 39, as seen in Fig. 5. The gasket 38 further comprises an annular lip 55 projecting from the surface 45 and spaced radially inwardly from the outer periphery of the portion 41 of the gasket 38. The lip 55, as is shown in Fig. 6 before the gasket 38 is installed in the coupler, normally extends generally axially but is inclined slightly inwardly toward the axis of the gasket opening 40.

The gasket 38 may be installed in the coupler 19 by inserting the gasket through the opening 26 and forcing it into the groove 39 of the coupler. Fig. 6 shows in phantom lines the portions of the coupler adjacent the groove surface 49 which interfere with and cause compression or deformation of the gasket when the latter is fitted in the groove 39. After the gasket is installed in the coupler 19, the outer corner of the gasket portion 41 at the surface 45 is squeezed or deformed so that the portion 41 is compressed between the surfaces 47 and 49. In addition, the lip 55, which is relatively thin and flexible, is displaced or deformed by the surface 49 so as to extend generally radially inwardly, as is shown in Fig. 5. The forces caused by the deformation of the lip 55 cause the lip to move into tight engagement with the wedge surface 49 of the coupler 19, thereby positively sealing the gasket 38 against the coupler.

Two couplers 19 may be conventionally connected together, as shown in FIG. 2, by overlapping the connecting portions 23 and aligning the gaskets 38 of the couplers with one coupler at substantially right angles to the other coupler, as seen in dashed lines, and then rotating one or both couplers (e.g., rotating the right-hand coupler in Fig. 2 clockwise in the direction of the arrow 57) to the solid line position so that the arcuate flanges and lips are interlocked. As is shown in Fig. 3, the flange 31 on the right-hand coupler 19 then engages with the lip 37 of the flange 35 on the left-hand coupler 19, and the lip 37 of the flange 35 on the right-hand coupler 19 engages with the flange 31 of the left-hand coupler 19, the respective pairs of lips 33 and 37 being interfitted to hold the couplers together with the openings 26 in axial alignment and the gaskets 38 in endwise axial contact, as described below. A coupler 19 having a gasket 38 of the present invention can also be satisfactorily connected to a coupler having a conventional gasket.

The axially extending portions 602–38 have formed on their ends mating surfaces 59 (Figs. 3 and 5) which abut one another to provide a seal between the gaskets of the two connected couplers 19. To this end, there is formed on the gasket 38 an annular axially projecting protuberance or ridge 61 (Figs. 5 and 6) which is on the same side of the gasket 38 as is the lip 55 and is directly opposite the mating surface 59 on the axially extending portion 43. The ridge 61, which is spaced from the lip 55 by an annular recess or pocket 73 in the gasket body, has in cross-section a generally V-shaped or tapered configuration defined by angular surfaces 74 and 75 with an inner or base portion which is relatively thick (as compared to the lip 55) and a relatively sharp radiused tip portion at the outer edge thereof. As seen in Fig. 6, the ridge 61 is concentrically spaced between the lip 55 and the gasket opening 40, and the lip 55 before being deflected to its Fig. 5 position is inclined toward the ridge 61 and extends in a direction generally parallel to the angular surface 74 of the ridge 61. Thus, the lip 55 is concentrically spaced between the ridge 61 and the outer periphery of the gasket portion 41. When the two couplers 19 are connected, the gaskets 38 abut at their surfaces 59 and are pressed axially together, and the ridge 61 of each gasket is compressed into tighter sealing engagement with the surface 49 of the coupler, as is indicated at 63 (Fig. 5). The axially extending portion 43 preferably has an increased nominal height, e.g., 0.010 inches higher than the Association of American Railroads standard gasket specification M 602–63 nominal height of 0.382 inch (the standard includes a range of 0.380 inch minimum to 0.393 inch maximum) so as to insure sealing between the mating surfaces of the two gaskets and compression of the ridges 61 even if the mating surfaces 59 wear.

The mating surface 59 of the gasket 38 has radiused or rounded corner edges as is indicated at 65 (Fig. 5) to reduce tearing or abrasion of the gasket 38 during coupling and uncoupling. As is shown in dashed lines in Fig. 5, before the gasket is compressed the mating surface 59 has a contoured shape to provide outer portions 67 which are raised while a center portion 69 of the surface 59 is depressed below or lower than the portions 67. This construction accomodates the increased axial dimension of the gasket, as discussed above, and permits the two mating surfaces 59 of the two gaskets 38 to deform and lie generally flat, as indicated in solid lines in Fig. 5, when the couplers 19 are connected. Thus, a seal is formed generally across the full width of the mating surfaces 59 of the gaskets 38.

When the surface 59 of the gasket 38 begins to wear so that the ridge 61 is no longer compressed as tightly against the surface 49, the lip 55 will still independently seal the gasket 38 against the coupler 19. As will be understood, air pressure in the passage 25 would then be communicated to the pocket behind the lip 55 to cause the lip to seal more tightly against the coupler 19. The pocket 73 also provides the necessary clearance to accommodate inward deflection of the lip 55 from its Fig. 6 position to its Fig. 5 position.

It will be understood that various modifications and equivalents of the structure illustrated in the drawing may be utilized without departing from the scope of the invention.

I claim:

1. In a gasket for a hose coupler of a railroad car air brake line or the like, comprising an annular one-piece body of resilient compressible material including an annular radially extending outer portion adapted to be received in a groove in the coupler and an annular axially extending inner portion having a mating surface at one axial end of said body and an annular axially projecting protuberance at the other axial end of said body, said mating surface being adapted to seal against the corresponding matingsurface of a second gasket and said protuberance having a tapered configuration in cross-section with a relatively thick base portion and an outer tip portion adapted to be compressed into sealing engagement with the wall of the coupler groove upon installation of the gasket in the coupler groove; the improvement which comprises:

an annular sealing lip at said other axial end of said body concentrically spaced between said protuberance and the outer periphery of said annular radially extending outer portion, said lip being thin and flexible compared to said protuberance, and said gasket body being recessed between said protuberance and said lip to provide an annular pocket, said lip extending generally axially from said other end of said body and being inclined inwardly toward said protuberance before installation of the gasket in the coupler groove and being adapted to be displaced further toward said protuberance upon installation of the gasket in the coupler groove, thereby compressing said lip in sealing engagement against the wall of the coupler groove, and said lip also being adapted to be further compressed into sealing engagement with the wall of the coupler groove by fluid under pressure communicating with said recess.

2. A gasket as in claim 1, wherein said lip is adapted to be deformed to extend generally radially inwardly of the gasket body upon installation in the coupler groove.

3. A gasket as in claim 1, wherein said mating surface has a raised portion and a lower portion, said raised and lower portions being adapted to deform into a generally flat surface upon engagement of said gasket with a second gasket.

4. A gasket as in claim 3, wherein said annular axially extending inner portion has a rounded corner edge adjacent said mating surface for eliminating tearing or abrasion of said gasket during coupling and uncoupling.

* * * * *